April 6, 1943.  C. W. HANSELL  2,315,897
REPLACEABLE FITTING
Filed April 12, 1939
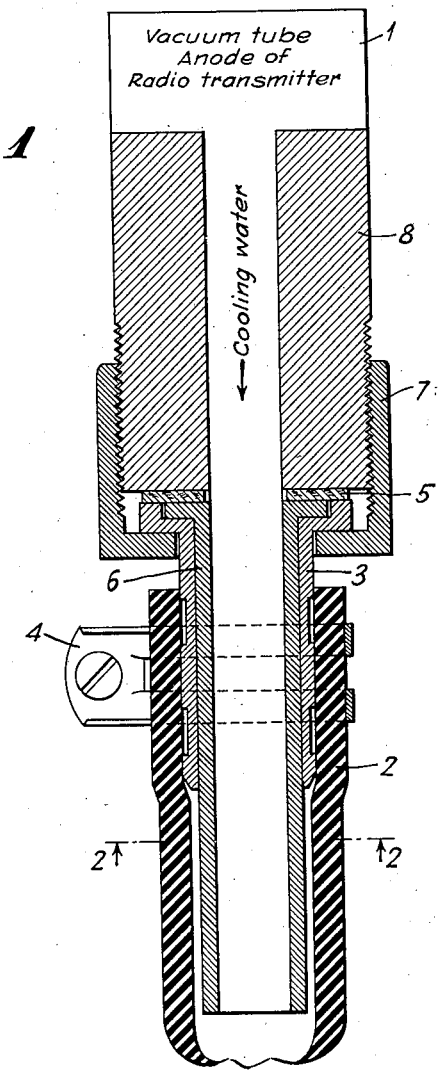
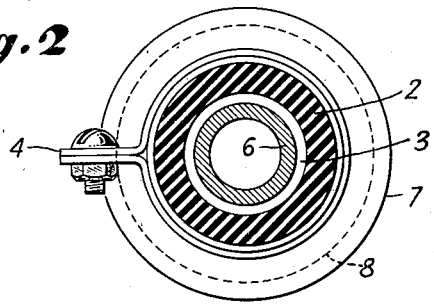
INVENTOR
CLARENCE W. HANSELL
BY
ATTORNEY Patented Apr. 6, 1943

2,315,897

UNITED STATES PATENT OFFICE 2,315,897

REPLACEABLE FITTING

Clarence W. Hansell, Port Jefferson, N. Y., assignor to Radio Corporation of America, a corporation of Delaware Application April 12, 1939, Serial No. 267,406

1 Claim. (Cl. 204—197)

This invention relates to a new and improved replaceable fitting used to make connection to the ends of liquid insulators where disintegration of the fittings by electrolysis make take place. A typical application is to vacuum tube cooling system for a radio transmitter.

A primary object of this invention is to provide an arrangement in which electrolysis takes place substantially only on parts which are readily replaceable so that other parts, which it is desired to make more permanent, are protected from electrolytic deterioration.

Another object of this invention is to provide a novel and easily replaceable hose nipple liner which can be changed without damaging the hose and other fittings.

Still another object of this invention is to provide a hose nipple which will eliminate the necessity of periodic changing of the fittings at the end of the cooling hose.

A feature of this invention is a metallic member which telescopes within a hose nipple and extends well beyond the length of the nipple so as to act as an electrical shield.

I have found in the cooling systems of vacuum tubes for radio transmitters, such as for example in the cooling system disclosed by the Hallberg Patent #1,963,131, dated June 19, 1934, that it is necessary to make periodic changing of the hose nipples which are used to make connection to the ends of the rubber hose or to the ends of porcelain coils used to insulate water-cooled tube equipment from ground potential. The water column within the insulating conduit of such a system has a relatively high resistance so that power losses due to direct current flowing through the water are small, even though there may be from 5,000 to 20,000 volts across the length of the conduit. However, in such an arrangement, the current which does flow, even though it is small, causes continuous disintegration of the metal end fittings by electrolysis, and therefore if failures are to be avoided, it is necessary to frequently replace the fittings. The changing of fittings or nipples, at the end of rubber and fabric hose, for example, must be more frequently done at stations having cooling water of low resistivity. Such frequent changes usually entail a disruption of service. Also, it is quite a job, because usually the hose must be cut to take off the nipples, as after a period of use, the hose and the metallic nipples are securely bound together. This cutting of the hose shortens the length and makes it necessary to replace the same, which results in an economic loss for the reason that in most cases, the useful life of the hose is found to be several times that of the nipples, and therefore it is wasteful to throw the usable hose away. Likewise, in the case where porcelain coils are used instead of a hose, the coils are naturally expected to be permanent and only the metal fittings which are subject to electrolysis require changing.

By my invention, I propose to overcome or lessen the difficulties associated with changing the nipples and metallic fittings which are subject to electrolysis in the normal operation thereof by employing a loose fitting inner nipple or liner which can be changed easily without disturbing any of the permanent connections.

This invention will best be understood by referring to the accompanying drawing, in which:

Fig. 1 is a longitudinal section; and
Fig. 2 is a cross-section on lines 2—2 of Fig. 1.

Referring now in detail to the drawing, block 1 represents a vacuum tube of a radio transmitter which has a connection to a cooling fluid circulating system through a rubber and fabric hose 2. The ends of hose 2 are provided with the usual nipples of which one is shown at 3, including a hose clamp 4 and a gasket 5. Telescoping within nipple 3 is a second metallic fitting or inner liner 6 which is preferably made of material relatively resistent to the effects of electrolysis, such as babbitt metal, bronze, lead, stainless steel, etc. The inner liner 6 is made long enough to extend down into the water column well past any of the permanent metal fittings, such as hose nipple 3. Because liner 6 extends beyond the end of nipple 3, it acts as an electric shield for the nipple. Any electrical current flowing through the water in the hose, due to the existence of an electrical potential between the metallic parts at opposite ends of the hose, will flow to or from the end portion of the liner, rather than from the end of nipple 3. Consequently, electrolysis of the metal takes place substantially only at the replaceable liner 6, and not on the nipple. Naturally, the liners will be slowly destroyed by electrolysis, but due to their long dimensional length, the matter of disintegration is over a reasonably long period of time, and therefore it is only necessary to replace them often enough to prevent any substantial electrolysis to the hose nipple. The choice of material to use with the nipples and liners is capable of a wide range. Other things neglected, it is desirable to use a pure material which has a low product of electro-chemical equivalent and density, that is, so that a minimum volume of material will be transferred by a given electrical charge. I have found through experience that the nipples and liners should be of like material or at least of material of electrolytically equal potentials, to prevent electrolysis due to electrical currents flowing between them. The hose nipple 3, gasket 5 and replaceable liner 6 are all clamped to the end of the fitting 8 by means of a nut 7, or by any other suitable clamping means.

In the arrangement shown in Fig. 1, it should be noted that compressible gasket 5 serves the double purpose of preventing liquid leaks at the joint and of pressing the liner 6 into good electrical contact with the hose nipple 3.

Although only one embodiment of this invention is disclosed, it is to be understood that it is not to be limited to the precise arrangement shown but is applicable to any similar electrolysis problem or condition.

What is claimed is:

A replaceable fitting for apparatus subjected to electrolysis in the normal operation thereof comprising a metallic flanged-shaped member for terminating the ends of a fluid conducting member, and a second metallic flanged-shaped member telescoped within said first metallic member, the length of said second member being greater than said first member to prevent electrolysis forming on said first mentioned member, and a ring-like compressible gasket member covering the flanged ends of both the first and second members to prevent leakage of fluid and for maintaining both flange-shaped members in good electrical contact.

CLARENCE W. HANSELL.